(12) United States Patent
Yan et al.

(10) Patent No.: US 11,947,972 B2
(45) Date of Patent: *Apr. 2, 2024

(54) COORDINATING POWER TRANSITIONS BETWEEN A SMART INTERCONNECT AND HETEROGENEOUS COMPONENTS

(71) Applicant: Shenzhen Chipuller Chip Technology Co., LTD, Shenzhen (CN)

(72) Inventors: Meng Yan, Milpitas, CA (US); Omar Mahmoud Afdal Alnaggar, Palo Alto, CA (US); Myron O. Shak, San Jose, CA (US); Soheil Gharahi, Mountain View, CA (US); William Kelsey, San Francisco, CA (US)

(73) Assignee: Shenzhen Chipuller Chip Technology Co., LTD, Shenzhen (CN)

(*) Notice: Subject to any disclaimer, the term of this patent is extended or adjusted under 35 U.S.C. 154(b) by 10 days.

This patent is subject to a terminal disclaimer.

(21) Appl. No.: 17/395,313

(22) Filed: Aug. 5, 2021

(65) Prior Publication Data

US 2021/0365273 A1    Nov. 25, 2021

Related U.S. Application Data

(63) Continuation of application No. 16/153,607, filed on Oct. 5, 2018, now Pat. No. 11,113,076.

(60) Provisional application No. 62/569,410, filed on Oct. 6, 2017.

(51) Int. Cl.
*G06F 9/4401* (2018.01)
*G06F 1/24* (2006.01)
*G06F 1/26* (2006.01)
*G06F 9/445* (2018.01)
*G06F 13/42* (2006.01)
(Continued)

(52) U.S. Cl.
CPC ............ *G06F 9/44505* (2013.01); *G06F 1/24* (2013.01); *G06F 1/26* (2013.01); *G06F 13/4282* (2013.01); *G06F 21/572* (2013.01); *G06F 21/575* (2013.01); *G06F 21/81* (2013.01); *G06F 2213/0016* (2013.01); *G06F 2221/034* (2013.01)

(58) Field of Classification Search
None
See application file for complete search history.

(56) References Cited

U.S. PATENT DOCUMENTS

| 7,793,005 | B1 | 9/2010 | Fernald et al. |
| 7,902,654 | B2 * | 3/2011 | Choa-Eoan ......... H03K 17/223 257/E23.079 |
| 8,589,704 | B2 | 11/2013 | Huynh |

(Continued)

OTHER PUBLICATIONS

Final Office Action dated Apr. 1, 2021 for U.S. Appl. No. 16/153,607.
(Continued)

*Primary Examiner* — Fahmida Rahman
(74) *Attorney, Agent, or Firm* — MUGHAL GAUDRY & FRANKLIN PC

(57) ABSTRACT

Described is an apparatus comprising a semiconductor interconnect substrate and an interface. The semiconductor interconnect substrate may be electrically coupled to one or more components mounted thereon. The interface may be operable to carry a configuration command set to the one or more components in a normal operation mode subsequent to a power-up mode.

10 Claims, 10 Drawing Sheets

(51) Int. Cl.
   *G06F 21/57*     (2013.01)
   *G06F 21/81*     (2013.01)

(56) References Cited

U.S. PATENT DOCUMENTS

| | | | |
|---|---|---|---|
| 11,487,445 B2 * | 11/2022 | Dasu | G06F 3/0629 |
| 2007/0075734 A1 | 4/2007 | Ramos et al. | |
| 2008/0071934 A1 | 3/2008 | Zhao et al. | |
| 2008/0279250 A1 * | 11/2008 | Kamei | G01K 7/32 |
| | | | 374/117 |
| 2016/0011576 A1 | 1/2016 | Takeda et al. | |
| 2016/0035630 A1 | 2/2016 | Vakada et al. | |
| 2016/0190113 A1 | 6/2016 | Sharan et al. | |
| 2017/0093300 A1 | 3/2017 | Akre | |
| 2019/0012116 A1 * | 1/2019 | Gutala | G06F 3/0632 |

OTHER PUBLICATIONS

Non-Final Office Action dated Apr. 6, 2020 for U.S. Appl. No. 16/153,607.
Non-Final Office Action dated Mar. 18, 2021 for U.S. Appl. No. 16/153,607.
Notice of Allowance dated May 17, 2021 for U.S. Appl. No. 16/153,607.
Advisory Action dated Dec. 30, 2020 for U.S. Appl. No. 16/153,607.
Final Office Action dated Oct. 16, 2020 for U.S. Appl. No. 16/153,607.

* cited by examiner

COORDINATING POWER TRANSITIONS BETWEEN A SMART INTERCONNECT AND HETEROGENEOUS COMPONENTS

CLAIM FOR PRIORITY

This application is a Continuation of and claims the benefit of priority to U.S. patent application Ser. No. 16/153,607, filed Oct. 5, 2018, and now issued as U.S. Pat. No. 11,113,076 on Sep. 7, 2021, and which is a Non-Provisional Application of, and claims the benefit of priority to U.S. Provisional Patent Application No. 62/569,410 filed Oct. 6, 2017, and which is incorporated by reference in its entirety.

BACKGROUND

Power management may be a significant consideration in modern integrated circuit designs. Various hardware techniques and software techniques may be used to gate circuits in order to reduce activity and save power when it may not be needed. Furthermore, coordinating power transitions, especially during initial power on, may be significant for proper functionality of the system, as improper power on sequencing may cause systems to improperly boot and be dead on arrival. Also, configurability may be a significant aspect of system bring-up, and may be achieved through the use of strapping pins, which may in turn be limited by the form-factor of the system.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Power management may be an important consideration in integrated circuit designs. Various hardware techniques and software techniques may be used to gate circuits in order to reduce activity and save power, and the coordination of power transitions may be important for proper functionality of the system. Configurability may also be an important for system bring-up. Configurability may be achieved through the use of strapping pins, which may in turn be limited by the form factor of the system.

Figure 1:
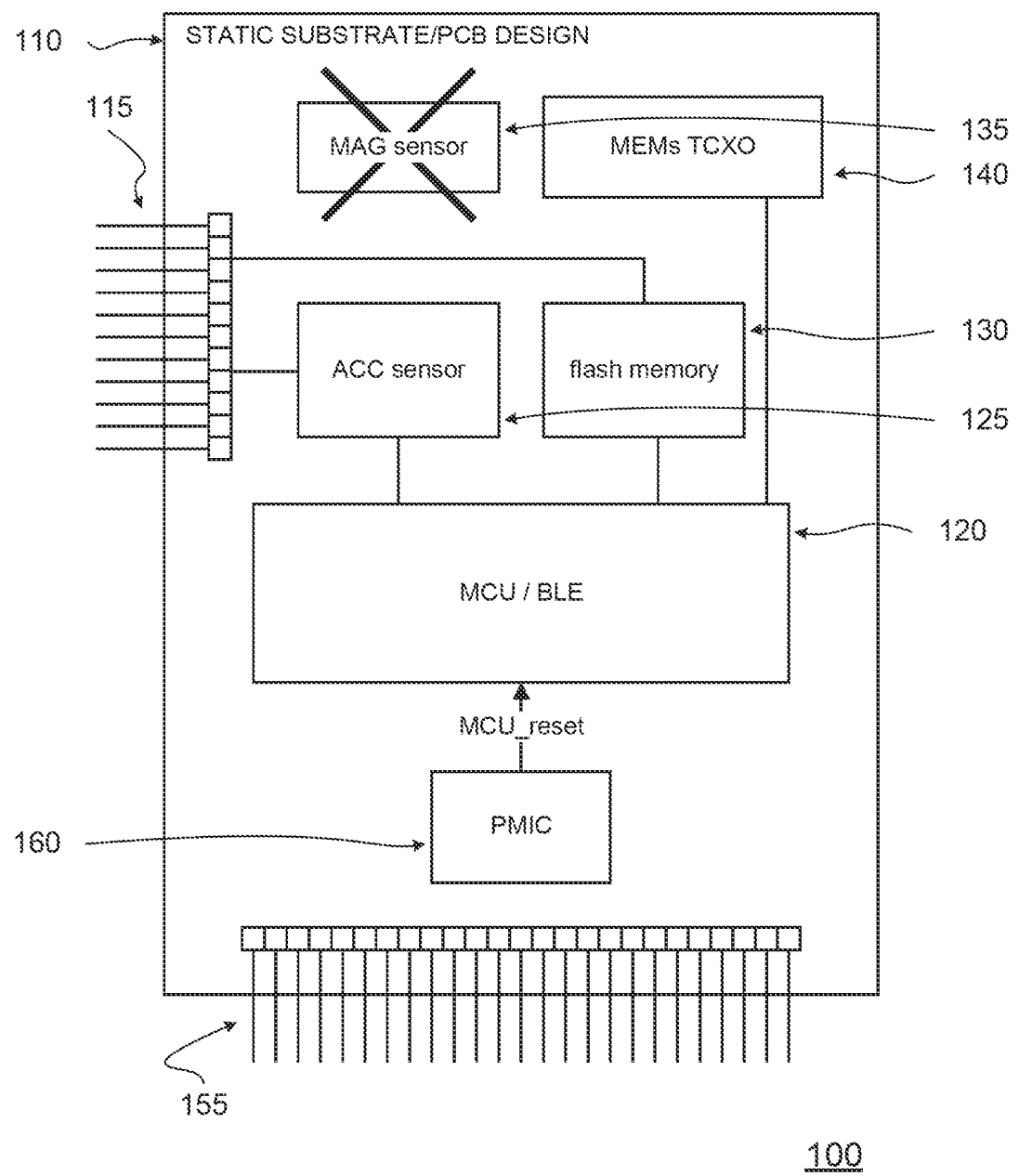
FIG. 1 illustrates a system comprising a static Printed Circuit Board (PCB) and substrate, in accordance with some embodiments of the disclosure.

FIG. 1 illustrates a system comprising a static Printed Circuit Board (PCB) and substrate, in accordance with some embodiments of the disclosure. A system 100 may comprise a static substrate and/or PCB design 110 including various components. Static substrate and/or PCB design 110 may include a microcontroller unit (MCU) or Bluetooth low energy (BLE) 120, an accelerometer (ACC) sensor 125, a nonvolatile memory 130 (e.g., a flash memory), a magnetic (MAG) sensor 135, and/or a microelectromechanical systems (MEMs) temperature-compensated crystal oscillator (TCXO) 140, as well as one or more component strapping pins 115.

System 100 (and/or static substrate and/or PCB design 110) may also include a power management integrated circuit (PMIC) 160, as well as one or more PMIC strapping pins 155.

A PCB/substrate design of the sort depicted in FIG. 1 may be limited in terms of flexibility and cost. Strapping pins 155 for hardcoded configuration of PMIC 160 may limit system flexibility and/or may increase design costs. It may also be desirable to expose component strapping pins 115 if they are not on the substrate, which may increase costs. Moreover, a connectivity of system 100 may be static, and may not be disposed to being changed during operation (e.g., being changed "on the fly"). Static substrate and/or PCB design 110 may not be operable to being reconfigured (e.g., by removing a component, such as MAG sensor 135), which may limit flexibility.

For systems adopting an active smart interconnect in place of a PCB design of the sort depicted in FIG. 1, power management considerations may be complicated. PCB boards may incorporate simple wiring and may have many fewer power and signaling considerations than an active interconnect may have. In comparison, an active interconnect may have its own power on sequencing and power transition management concerns, and an active interconnect may be accompanied by changes to a system's original firmware, which may make the transition from a PCB design to an active smart interconnect non-seamless. Since schedule and legacy code support may be important for the success of a design, such issues (and others) may have limited the success of smart interconnects in the broader market, especially in the Internet-of-Things (IoT) industry where designs may be fragmented and custom.

Accordingly, a simple power management method that may affect existing code as little as possible may advantageously reduce the difficulty of adopting smart interconnects over PCB designs. Furthermore, once an active smart interconnect is adopted, new power management features—such as a feature called dynamic hardware programming (DHP) herein—may be used to further lower power consumption, which may advantageously add value relative to what may be achieved by static PCB wiring.

Disclosed herein are mechanisms and methods related to the field of programmable interconnect substrates used in packaging electronics, and to stacked integrated circuits produced for application in low-power and small form-factor designs with fast prototyping and short mass-production cycle times. The mechanisms and methods described herein may enable and/or facilitate power management coordination between an active smart interconnect and/or components mounted to the active smart interconnect, and may thereby seamlessly and efficiently manage state transitions and power modes, and enable new power transition capabilities (e.g., based upon DHP).

The mechanisms and methods for power management for smart interconnects disclosed herein may address various issues. For example, by implementing a specific multi-stage sequence managed by an internal power kernel, an active smart interconnect may coordinate highly configurable power-on behaviors with a limited number of strapping pins. Furthermore, the power-on behavior may be fully abstracted away from firmware and from a system on top of an interposer (e.g., an active smart interconnect), which may allow for little to no changes to custom code while enabling full legacy system support.

Additional features, such as interposer power mode transitions, PMIC configurations, and DHP may be accessed by firmware extensions through various commands of an interface, such as serial peripheral interface (SPI) or inter-integrated circuit (I2C). Interposer configurability may aid the firmware in actively tuning the state and power consumption of the interconnect. It may also facilitate tuning and trimming of the interposer's internal PMIC, and may provide built-in monitoring support, such as fuel gauge counters, thermal alarms, and overcurrent detections.

The novel DHP feature discussed herein may allow firmware to change a physical connectivity of the system while it is still active (e.g., "on the fly"). This may in turn allow components (such as sensors) to be physically disconnected and/or reconnected to their respective power rails as desired, which may advantageously lower leakage current. Such functionality may be enabled by the smart interconnect through active management of power rail domains and wire routing by firmware using SPI or I2C commands, and is not be possible on a traditional static PCB design.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals may be represented with lines. Some lines may be thicker, which may indicate a greater number of constituent signal paths, and/or may have arrows at one or more ends, which may indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

As will be apparent to one skilled in the art, in various embodiments, elements of one figure having the same names and/or reference numbers as the elements of any other figure may operate or function in any manner similar to that described, but are not limited to such. Furthermore, the particular features, structures, functions, or characteristics of any embodiment may be combined in any suitable manner with the features, structures, functions, and/or characteristics of one or more other embodiments. For example, a first embodiment may be combined with a second embodiment anywhere the particular features, structures, functions, or characteristics associated with the two embodiments are not mutually exclusive.

Figure 2:
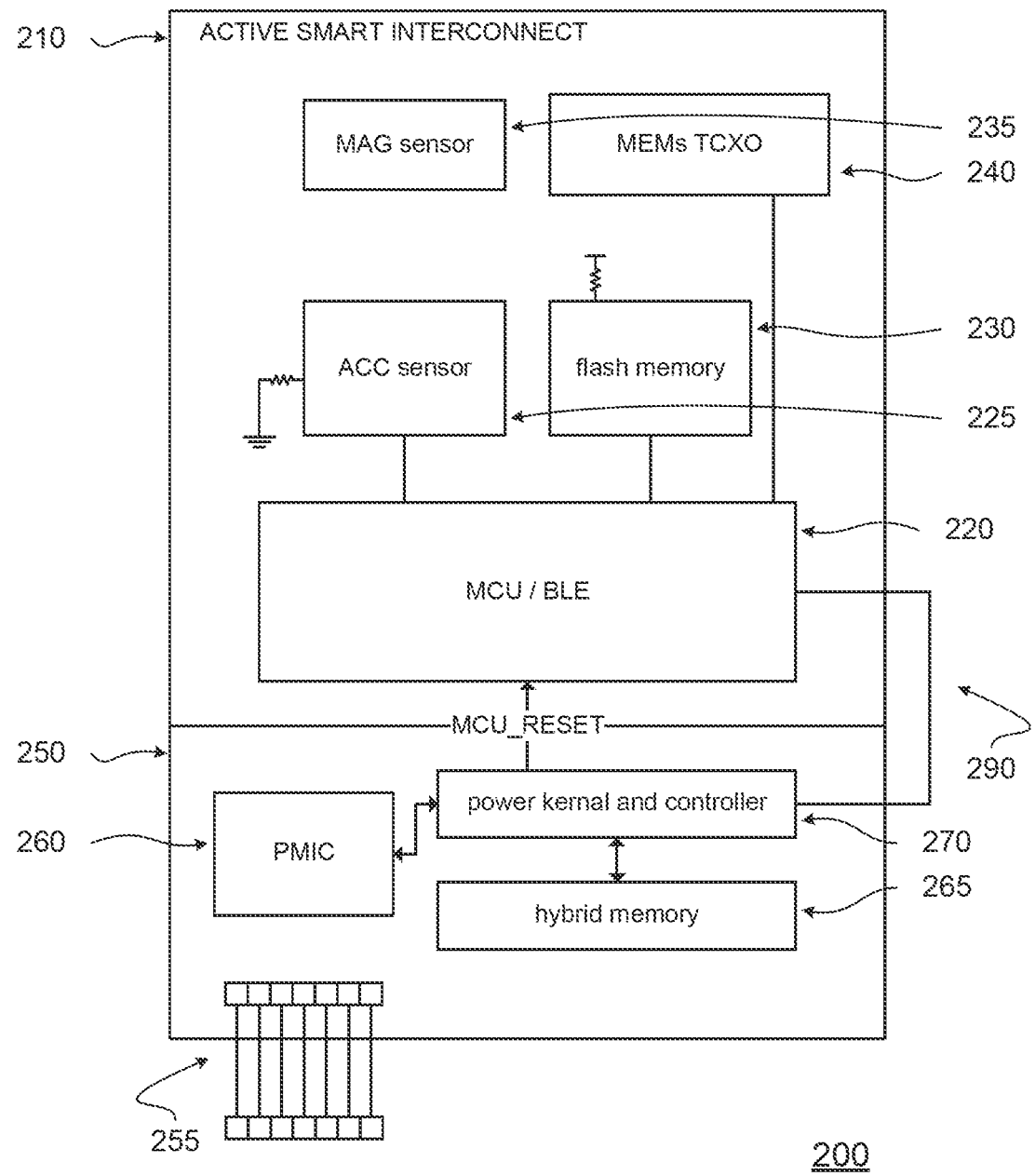
FIG. 2 illustrates a system comprising an active smart interconnect, in accordance with some embodiments of the disclosure.

FIG. 2 illustrates a system comprising an active smart interconnect, in accordance with some embodiments of the disclosure. A system 200 may comprise an active smart interconnect portion 210 including various components or "chiplets". For example, in various embodiments, active smart interconnect portion 210 may include an MCU or BLE 220, an ACC sensor 225, a nonvolatile memory 230, a MAG sensor 235, and/or a MEMs TCXO 240. In various embodiments, the active smart interconnect portion 210 may be an interposer that is, or includes, an integrated circuit. For various embodiments, the components or "chiplets" may be, or may include, semiconductor dies, integrated circuits, and/or semiconductor chips.

System 200 may also comprise a configuration portion 250, which may include a PMIC 260, a memory 265 (e.g., a hybrid memory), and/or a power kernel and controller 270, as well as one or more strapping pins 255.

FIG. 2 depicts a solution for power management of an active smart interconnect (e.g., active smart interconnect 210). Internal logic within system 210 (e.g., within configuration portion 250) may handle sequencing and/or control of various power functions, and may handle them in a way that minimizes changes to existing code and system collateral. The flow may be optimized for flexibility, cost, and/or power savings (as detailed further herein).

Strapping pins 255 may be operable to configure static behavior of the interconnect. In comparison with component the set of strapping pins 115 and/or the set of PMIC strapping pins 155, the set of strapping pins 255 may be reduced. In addition, power kernel and controller 270 may be operable to download various system and/or component configurations from memory (referred to herein as "BootCfg" configurations), and/or to initialize system 200. Power kernel and controller 270 may be operable to sequence one or more reset signals (such as a signal "MCU_RESET," which may be a reset signal to MCU or BLE 220), which may initialize system 200 and/or active smart interconnect portion 210.

An interface 290 may also extend between configuration portion 250 (and/or power kernel and controller 270) at one end, and active smart interconnect portion 210 (and/or MCU or BLE 220) at another end. In comparison with system 100, a firmware of system 200 may dynamically update configurations of system 200 via interface 290, such as through SPI commands, I2C commands, or other commands.

In some embodiments, one or more BootCfg configurations may also configure various components dynamically (e.g., while the system is active, or during operation), such as by establishing "strapping" values for various component interfaces. In some embodiments, BootCfg configurations may also configure inter-component routing and/or component connectivity. In various embodiments, components may accordingly be dynamically added to and/or removed from system 200 (and/or active smart interconnect 210) through DHP.

Figure 3A:
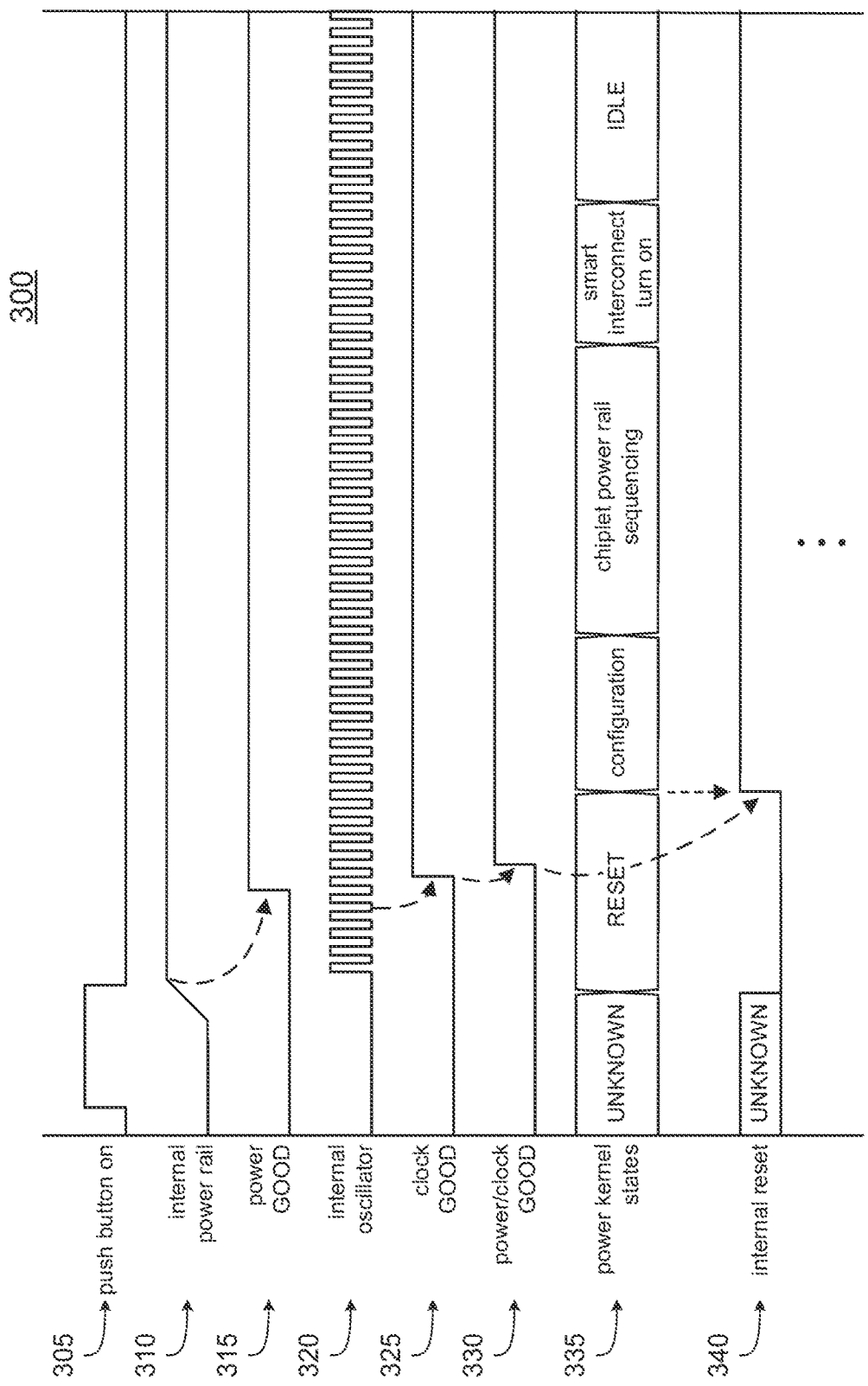
FIGS. 3A-3B illustrate an active smart interconnect power-on sequence, in accordance with some embodiments of the disclosure.
Figure 3B:
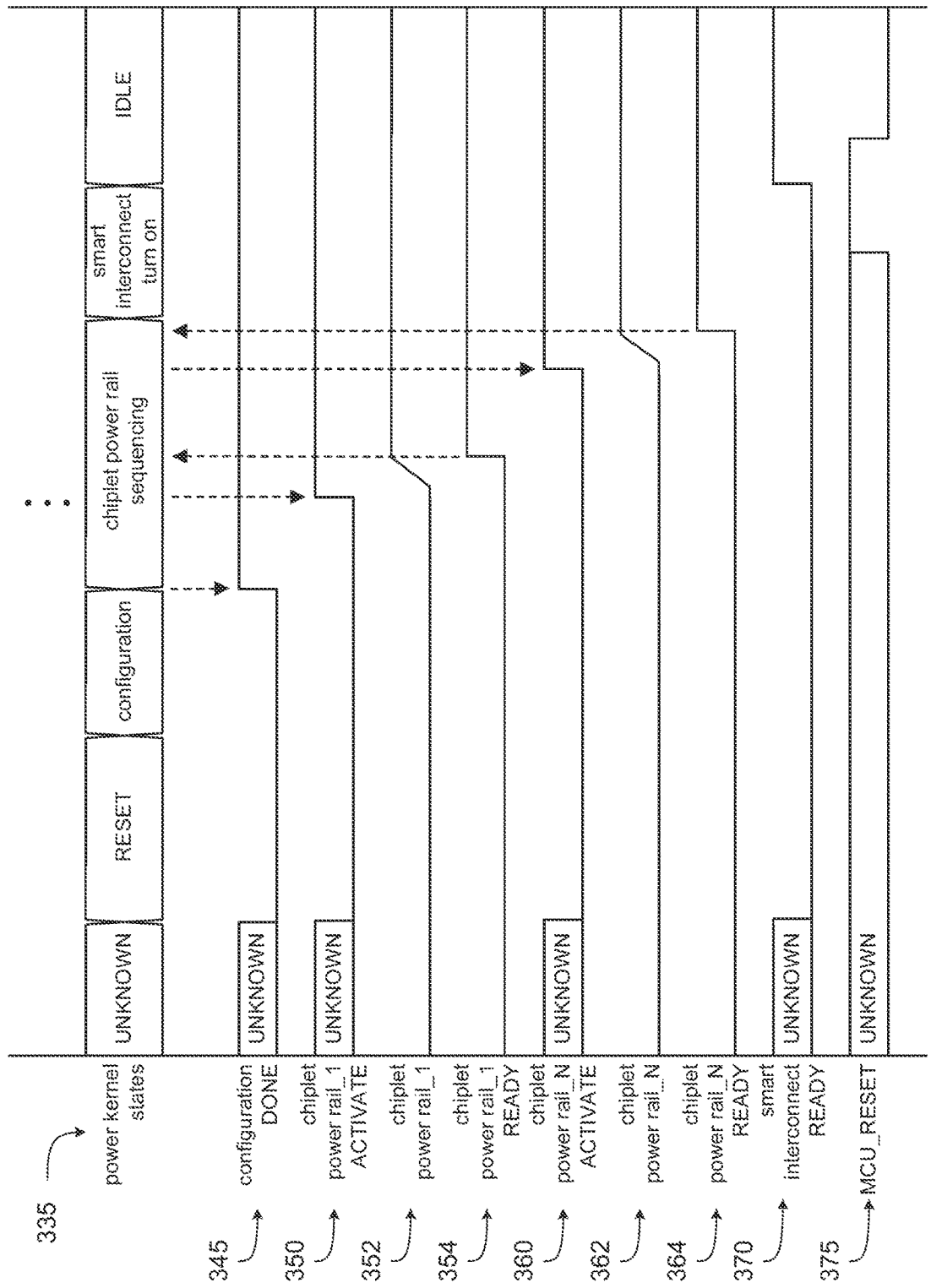

FIGS. 3A-3B illustrate an active smart interconnect power-on sequence, in accordance with some embodiments of the disclosure. A sequence 300 may pertain to a initiating event 305 (e.g., a pushing or toggling of an on/off button), an internal power rail 310, a power-good indicator 315, an internal oscillator 320, a clock-good indicator 325, a power-good and clock-good indicator 330, a power kernel state 335, an internal reset 340, a configuration done indicator 345, a first chiplet power rail activation indicator 350, a first chiplet power rail 352, a first chiplet power rail ready indicator 354, an Nth chiplet power rail activation indicator 360, an Nth chiplet power rail 362, an Nth chiplet power rail ready indicator 364, an active smart interconnect ready indicator 370, and an MCU_RESET signal 375. (As used herein, an "indicator" may comprise a condition and/or a signal pertaining to a condition.)

Following initiating event 305 (e.g., a pushing of an "on" button), internal power rail 310 may rise from a no-voltage (or low-voltage) condition to an operating-voltage condition, which may in turn lead to an assertion of power-good indicator 315. Internal oscillator 320 may begin to oscillate, which may in turn lead to an assertion of clock-good indicator 325. Subsequently, the assertion of both power-good indicator 315 and clock-good indicator 325 may lead to an assertion of power-good and clock-good indicator 330.

Before initiating event 305, power kernel state 335 may have an unknown value; after initiating event 305, power kernel state 335 may transition to a "reset" value. The assertion of power-good and clock-good indicator 330, and/or the transition of power kernel state 335 from the "reset" value to a "configuration" value, may lead to a deassertion of (e.g., a relaxation of) internal reset 340.

Subsequently, a transition of power kernel state 335 from the "configuration" value to a "chiplet power rail sequencing" value may lead to an assertion of configuration done indicator 345, and may thereafter lead to one or more chiplet power rail activation sequences.

In a first chiplet power rail activation sequence, first chiplet power rail activation indicator 350 (e.g., an "activation" for a first chiplet's power rail) may be asserted. First chiplet power rail 352 may then rise to an operating-voltage for the first chiplet. Then, first chiplet power rail ready indicator 354 (e.g., a "ready" indication for the first chiplet's power rail) may be asserted.

Subsequent chiplet power rail activation sequences may proceed similarly. Then, in an Nth chiplet power rail activation sequence, Nth chiplet power rail activation indicator 360 (e.g., an "activation" for an Nth chiplet's power rail) may be asserted; then, Nth chiplet power rail 362 may rise to an operating voltage for the Nth chiplet; then, Nth chiplet power rail ready indicator 364 (e.g., a "ready" indication for the Nth chiplet power rail) may be asserted.

Power kernel state 335 may then transition from the "chiplet power rail sequencing" value to a "smart interconnect turn on" value, and MCU_RESET 375 may be asserted. Subsequently, power kernel state 335 may transition from the "smart interconnect turn on" value to an "idle" value and MCU_RESET 375 may be deasserted. In some embodiments, further power-on sequencing may be controlled by the MCU.

FIGS. 3A-3B accordingly depict a power-on sequence for an active smart interconnect. The interconnect (e.g., system 200) may handle power-on behavior through an internal power kernel (e.g., power kernel and controller 270) that may stage power rail bring-up in a specific sequence.

First, upon receiving an external power-on request (e.g., through a push-button press, such as initiating event 305), an internal direct current to direct current (DC-DC) converter may begin supplying a stable input/output voltage (VDDIO) supply (e.g., 3.3 volt (V)), and may initialize turn-on of one or more 1.2 V low drop-out (LDOs) and clocks to digital logic within the interconnect. In various embodiments, the configurability of the DC-DC circuit, the 1.2 V LDOs, and/or the clocks may be defined using strapping pins, but some or all further configurability may be provided by 1.2 V circuitry and memory cells (e.g., mainly through the power kernel, which may greatly reduce a number of strapping pins used). As a result, various chiplets or components of system 200 may be configured through the power kernel.

Figure 4:
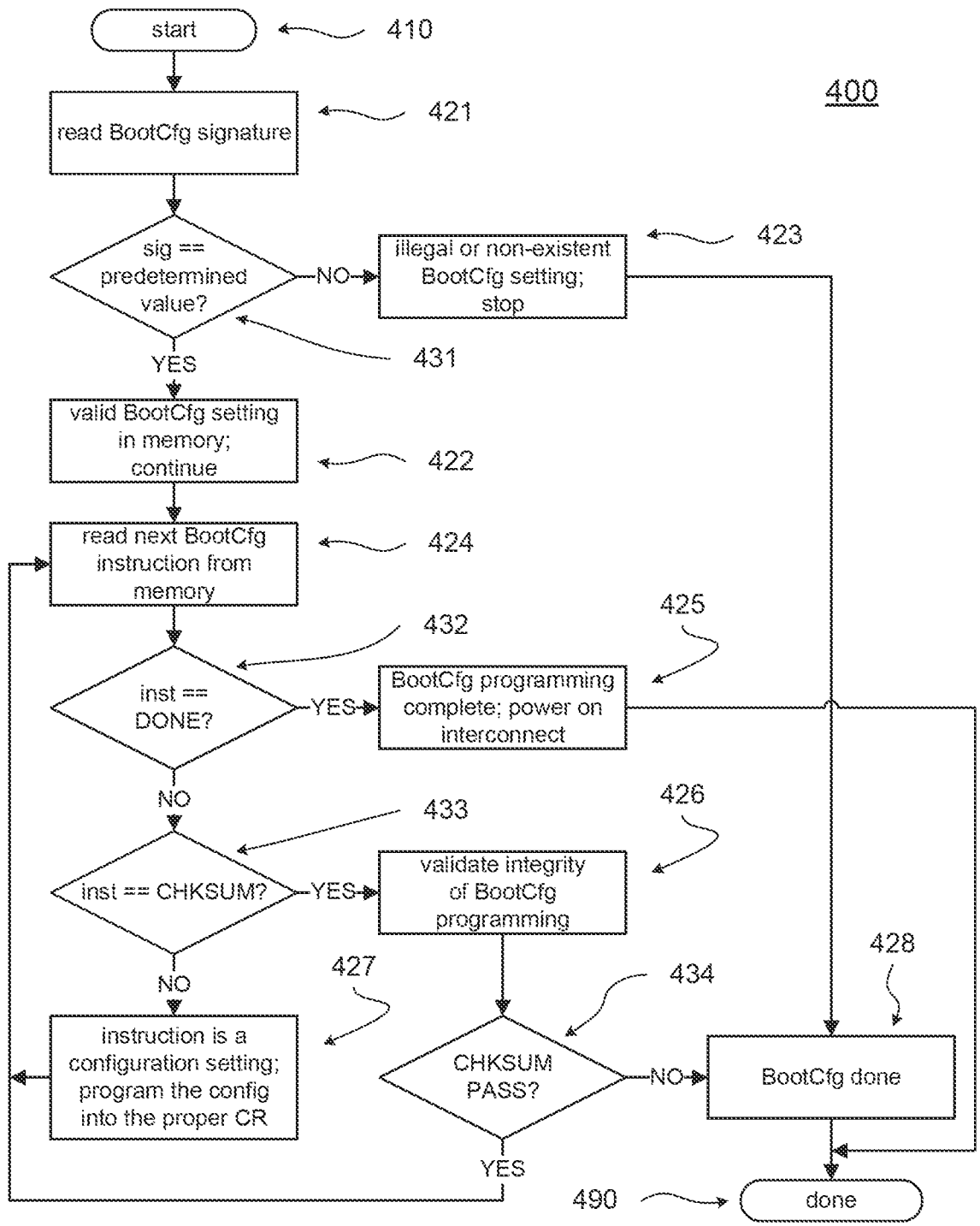
FIG. 4 illustrates a boot configuration agent decision flow diagram, in accordance with some embodiments of the disclosure.

FIG. 4 illustrates a boot configuration agent decision flow diagram, in accordance with some embodiments of the disclosure. A flow 400 may comprise a start 410, a first portion 421, a second portion 422, a third portion 423, a fourth portion 424, a fifth portion 425, a sixth portion 426, a seventh portion 427, and/or an eighth portion 428. Flow 400 may also comprise a first condition 431, a second condition 432, a third condition 433, and/or a fourth condition 434. Flow 400 may also comprise an end 490.

Following start 410, in first portion 421, a BootCfg signature may be read, and flow 400 may proceed to first condition 431. In first condition 431, if the signature matches a predetermined value (e.g., "110110"), flow 400 may proceed to second portion 422; otherwise, flow 400 may proceed to third portion 423. In second portion 422, a valid BootCfg setting may exist in a memory (e.g., memory 265), and flow 400 may proceed to fourth portion 424. In third portion 423, an illegal or non-existent BootCfg setting may exist, and flow 400 may stop (e.g., flow 400 may proceed through eighth portion 428 and/or may proceed to done 490).

In fourth portion 424, a next BootCfg instruction may be read from the memory. Then, in second condition 432, if the instruction read from the memory is a final instruction (e.g., a "done" instruction), flow 400 may proceed to fifth portion 425; otherwise, flow 400 may proceed to third condition 433. In fifth portion 425, BootCfg programming may be complete, the interconnect may be powered on, and flow 400 may then proceed to done 490.

In third condition 433, if the instruction read from memory is a check-sum instruction, then flow 400 may proceed to sixth portion 426; otherwise, flow 400 may proceed to seventh portion 427. In sixth portion 426, the integrity of BootCfg programming may be validated (e.g., via a check-sum), and flow 400 may proceed to fourth condition 434. In seventh portion 427, the instruction may be considered a configuration setting (or configuration setting instruction), and the configuration may be programmed into the proper configuration register (CR) or set of CRs (e.g., via a scan chain through a series of shadow CRs, which may be committed to the CRs by a triggering event), and flow 400 may return to fourth portion 424.

In fourth condition 434, if a checksum passes (i.e., a check-sum indicates that BootCfg programming passes, and/or is complete), then flow 400 may return to fourth portion 424; otherwise, flow 400 may proceed to eighth portion 428. In eighth portion 428, BootCfg may be considered done, and flow 400 may proceed to done 490.

Accordingly, in various embodiments, after a 1.2 V domain is stable, a power kernel (e.g., power kernel and controller 270) may control a remainder of a power-on sequence. After releasing resets to one or more 3.3 V domains and/or one or more 1.2 V domains, the power kernel may initialize a boot configuration agent. This agent may fetch one or more pre-configured settings from an embedded hybrid memory of the interposer (e.g., memory 265) and may load them into analog control registers and/or digital control registers.

FIG. 4 may accordingly depict at least part of a boot configuration agent's decision flowchart. After the boot configuration agent finishes loading the settings, the power kernel may then sequence the configuration of the remaining PMIC circuitry (e.g., PMIC 260) and/or may stage power-on of the 1.8 V/3.3 V voltage rails.

After analog circuitry is stable, the power kernel may then provide power to the system on the interconnect. For example, after powering up the interconnect, a FAST_READY signal may be supplied to indicate to any external masters that the interconnect is powered up. Furthermore, a programmable MCU_RESET signal may be de-asserted some delay after FAST_READY, which may provide for one or more MCUs dependent on the interconnect to have deterministic power-on and reset behaviors.

Figure 5:
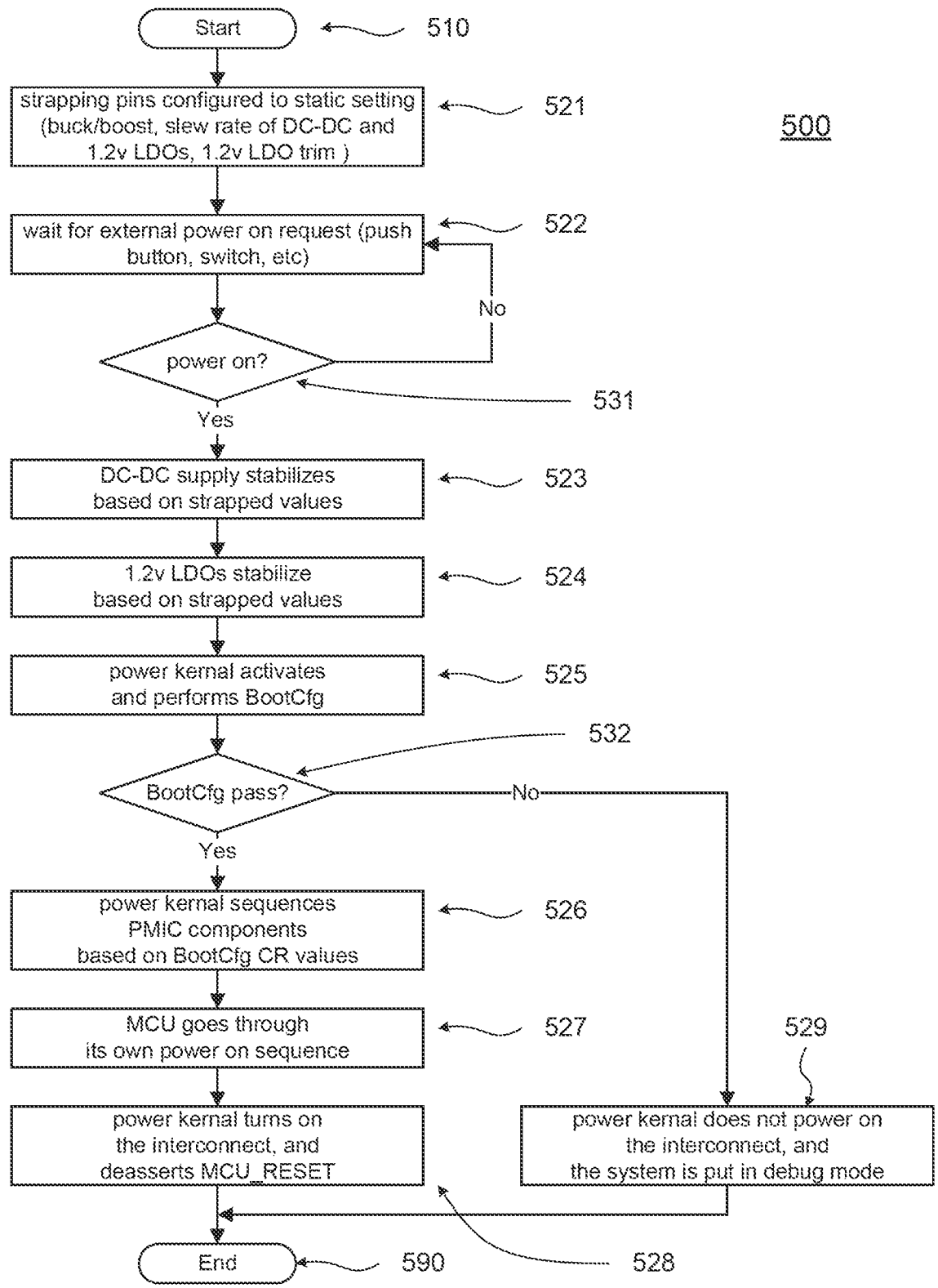
FIG. 5 illustrates a simplified power-on sequence flow diagram, in accordance with some embodiments of the disclosure.

FIG. 5 illustrates a simplified power-on sequence flow diagram, in accordance with some embodiments of the disclosure. A flow 500 may comprise a start 510, a first portion 521, a second portion 522, a third portion 523, a fourth portion 524, a fifth portion 525, a sixth portion 526, a seventh portion 527, an eighth portion 528, and/or a ninth portion 529. Flow 500 may also comprise a first condition 531 and/or a second condition 532. Flow 500 may also comprise an end 590.

Following start 510, in first portion 521, strapping pins (e.g., pertaining to buck/boost, slew rate of DC-DC and 1.2 V LDOs, and/or 1.2 V LDO trim) may be configured to a static setting. Then, in second portion 522, flow 500 may wait for an external power on request (e.g., a push button, switch, or the like). In first condition 531, until the external power on request, flow 500 may loop on second portion 522; upon the external power on request, flow 500 may proceed to third portion 523.

In third portion 523, one or more DC-DC supplies may stabilize based upon strapped values. Then, in fourth portion 524, one or more 1.2 V LDOs may stabilize based upon strapped values. Then, in fifth portion 525, a power kernel may activate and perform a BootCfg configuration, and flow 500 may proceed to second condition 532.

In second condition 532, if the BootCfg configuration passes, flow 500 may proceed through sixth portion 526, seventh portion 527, and eighth portion 528; otherwise, flow 500 may proceed to ninth portion 529. In sixth portion 526, the power kernel may sequence one or more components (e.g., PMIC components) based upon BootCfg CR values. In seventh portion 527, the MCU may go through its own power on sequence. In eighth portion 528, the power kernel may turn on the interconnect and/or may deassert MCU_RESET. In contrast, in ninth portion 529, the power kernel might not power on the interconnect, and the system may be put in debug mode.

Accordingly, FIG. 5 depicts a simplified power-on flowchart. At a high level, strapping pins may merely initialize the power kernel and boot configuration agent, and through a boot configuration program, the smart interconnect may download a remainder of programmable configuration options from a hybrid memory. After the interconnect is properly configured, power-on may be handed off to the MCU and legacy firmware by de-asserting MCU_RESET. The MCU may choose to use the MCU_RESET signal, or to rely on power being supplied to itself to turn on and begin its power-on sequence.

With the above flow, there might not be a custom handshake between the interconnect and firmware to power-on the system, and as such the interconnect may be similar to a traditional PCB with regards to power-on sequencing. Thus, there might be no custom support employed by firmware or the system to use the interconnect, and legacy code may function on the interconnect as is. In that respect, using a configurable interconnect on an agnostic system may advantageously enable more agile development and deployment of hardware solutions. Custom PCB designs may therefore no longer be used, and may be encompassed by simply mapping a new boot configuration image on the embedded hybrid memory within the interconnect. This may advantageously allow for faster time to market, as well as a more flexible supply chain, since generic un-programmed interconnects may be manufactured and stored for eventual use on a plethora of diverse systems.

Additional power management functionality may be utilized in a system where firmware is aware of the interconnect and uses firmware extensions on I2C or SPI to communicate with it. Specifically, configuration tuning, power state transitions, and dynamic hardware programming are features that may be enabled to optimize power usage.

Regarding configuration tuning, since most configuration settings may be stored in control registers accessible by firmware, a system may patch PMIC settings and may modify power states at will through firmware. This capability may be limited if configurations were only programmed through strapping pins. Analog PMIC configurations may be tuned after the power-on sequence in case there had been an issue with the hybrid memory boot configuration image, or to support features (such as Over-the-Air Hardware Updates (OTAHU)), which may allow for in-field updates of the interconnect without physically handling the device.

Firmware may control the interconnect's power states through SPI or I2C commands, which may allow the interconnect to operate at lower power profiles as may be indicated by the system. By managing the 1.2 V and 3.3 V LDOs, clocks, and interconnect switch connections, additional power consumed by the active interconnect may be reduced to sub-microamp levels, becoming a negligible portion of the overall power budget of the system.

Figure 6:
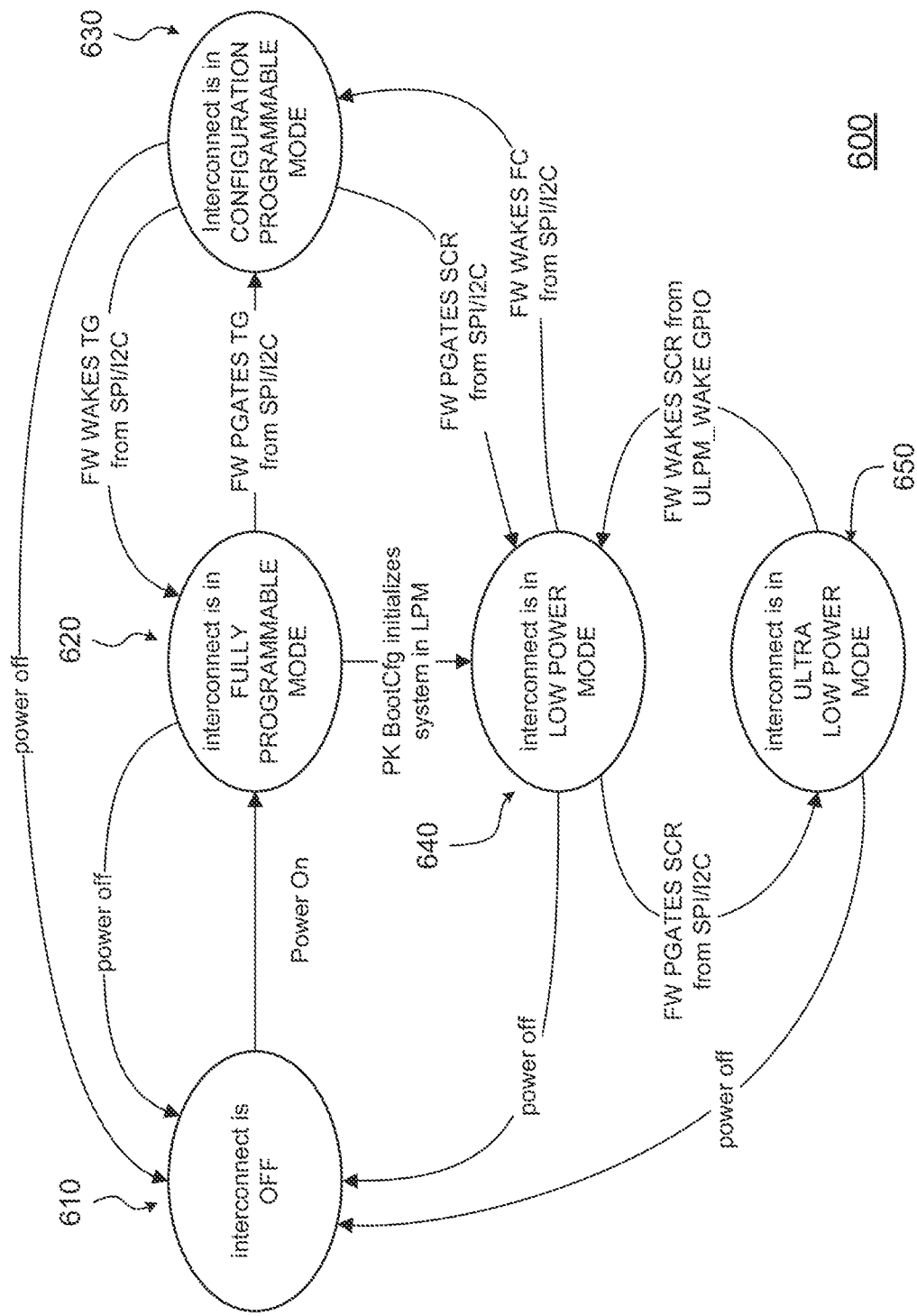
FIG. 6 illustrates an active smart interconnect power state transition finite state machine, in accordance with some embodiments of the disclosure.

FIG. 6 illustrates an active smart interconnect power state transition finite state machine, in accordance with some embodiments of the disclosure. A state machine 600 may comprise a first state 610, a second state 620, a third state 630, a fourth state 640, and a fifth state 650. In first state 610, an interconnect (e.g., system 200 and/or active smart interconnect portion 210) may be in an off mode. Upon a power-on event, state machine 600 may transition to second state 620.

In second state 620, the interconnect may be in a fully-programmable mode. In some embodiments, firmware instructions (e.g., via interface 290, such as SPI or I2C commands) may cause power-gating of a power domain of a Tile Grid (TG) (e.g., a region of an active smart interconnect), and may cause state machine 600 to transition to third state 630. In some embodiments, a power kernel (PK) BootCfg state (or stage) may initialize a system in a low-power mode, and may cause state machine 600 to transition to fourth state 640. In some embodiments, upon a power-off event, state machine 600 may transition back to first state 610.

In third state 630, the interconnect may be in a configuration programmable mode. In some embodiments, firmware instructions (e.g., via interface 290, such as SPI or I2C commands) may cause a wake event (e.g., a removal of power gating) for the power domain of the TG, and may cause state machine 600 to transition back to second state 630. In some embodiments, firmware instructions (e.g., via interface 290, such as SPI or I2C commands) may cause power-gating of a power domain for a Slave Interface and Control Registers (SCR) circuitry, and may cause state machine 600 to transition to fourth state 640. In some embodiments, upon a power-off event, state machine 600 may transition back to first state 610.

In fourth state 640, the interconnect may be in a low power mode. In some embodiments, firmware instructions (e.g., via interface 290, such as SPI or I2C commands) may cause power-gating of the power domain of the SCR circuitry, and may cause state machine 600 to transition to fifth state 650. In some embodiments, firmware instructions (e.g., via interface 290, such as SPI or I2C commands) may cause a wake event for a power domain of a Fabric Controller (FC), and may cause state machine 600 to transition to third state 630. In some embodiments, upon a power-off event, state machine 600 may transition back to first state 610.

In fifth state 650, the interconnect may be in an ultra-low power mode. In some embodiments, firmware instructions (e.g., via general-purpose IO (GPIO)) may cause a wake event for SCR, which may wake state machine 600 from the ultra-low power mode. In some embodiments, upon a power-off event, state machine 600 may transition back to first state 610.

Accordingly, various embodiments may support one or more of the following operating modes: a full interconnect programmability mode; a PMIC programmability mode; a Low-Power Mode (LPM); and/or an Ultra-Low-Power Mode (ULPM). FIG. 6 depicts finite state machines for an active smart interconnect's power state transitions. Various modes may offer additional degrees of communication and programmability of the interconnect at the cost of increased power consumption.

The full interconnect programmability mode may allow for dynamic configuration of system routing, and may enable dynamic hardware programming. The PMIC programmability mode may limit system changes, but may allow for tuning of the PMIC and observability of internal monitors such as thermal alarms, fuel gauges, and overcurrent detectors. In addition, it may enable functions that require more power than normal steady state operating modes, such as LED PWMs.

The LPM and the ULPM may allow the interconnect to operate in microamp to sub-microamp power ranges. The LPM may allows for firmware I2C or SPI communication to the interconnect such that firmware can send commands to transition the interconnect to a higher powered, programmable mode. The ULPM may disable I2C and SPI communication to further reduce leakage power consumption, which may allow the interconnect to operate at sub-microamp levels. If firmware wants to wake up the interconnect for future programming, it may do so through a dedicated general-purpose I/O (GPIO) connection to a ULPM_WAKE IO pin of the interconnect, which may transition the interconnect from the ULPM to the LPM.

Figure 7:
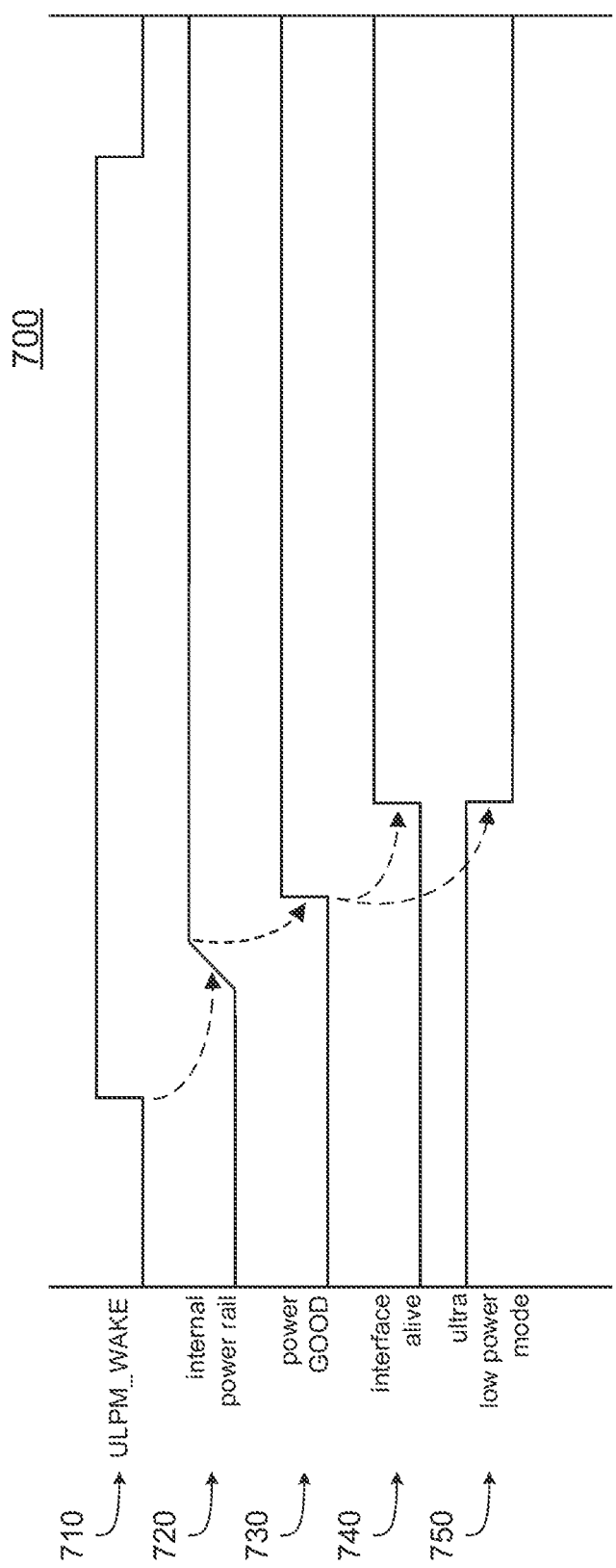
FIG. 7 illustrates an ultra-low power mode wake-up sequence, in accordance with some embodiments of the disclosure.

FIG. 7 illustrates an ultra-low power mode wake-up sequence, in accordance with some embodiments of the disclosure. A sequence 700 may pertain to an ultra-low power mode wake up event 710, an internal power rail 720, a power-good indicator 730, an interface-alive indicator 740 (e.g., an indicator of readiness or operability of an interface, such as a slave-interface aliveness indicator), and/or an ultra-low power mode indicator 750.

Following an assertion of ultra-low power mode wake up event 710, internal power rail 720 may rise (e.g., to an operating voltage). Power-good indicator 730 may then be asserted. Subsequently, interface alive indicator 740 may be asserted, and/or ultra-low power mode indicator 750 may be asserted.

Accordingly, in various embodiments, by allowing firmware to tune power modes of the interconnect, the interconnect itself may advantageously contribute negligible power consumption to the steady state power profile, which may in turn mitigate costs associated with replacing a PCB design with an active interconnect. Through this mechanism, firmware may also reprogram various functionalities of the system, such as re-tuning a PMIC based on battery levels or disabling power rails when not needed. This may facilitate DHP, by enabling firmware to reprogram an interconnect to physically disconnect sensors and components when they are not used, and/or to reconnect them when they are needed. This may in turn allow for additional power savings and might not be achievable in a PCB system.

Figure 8:
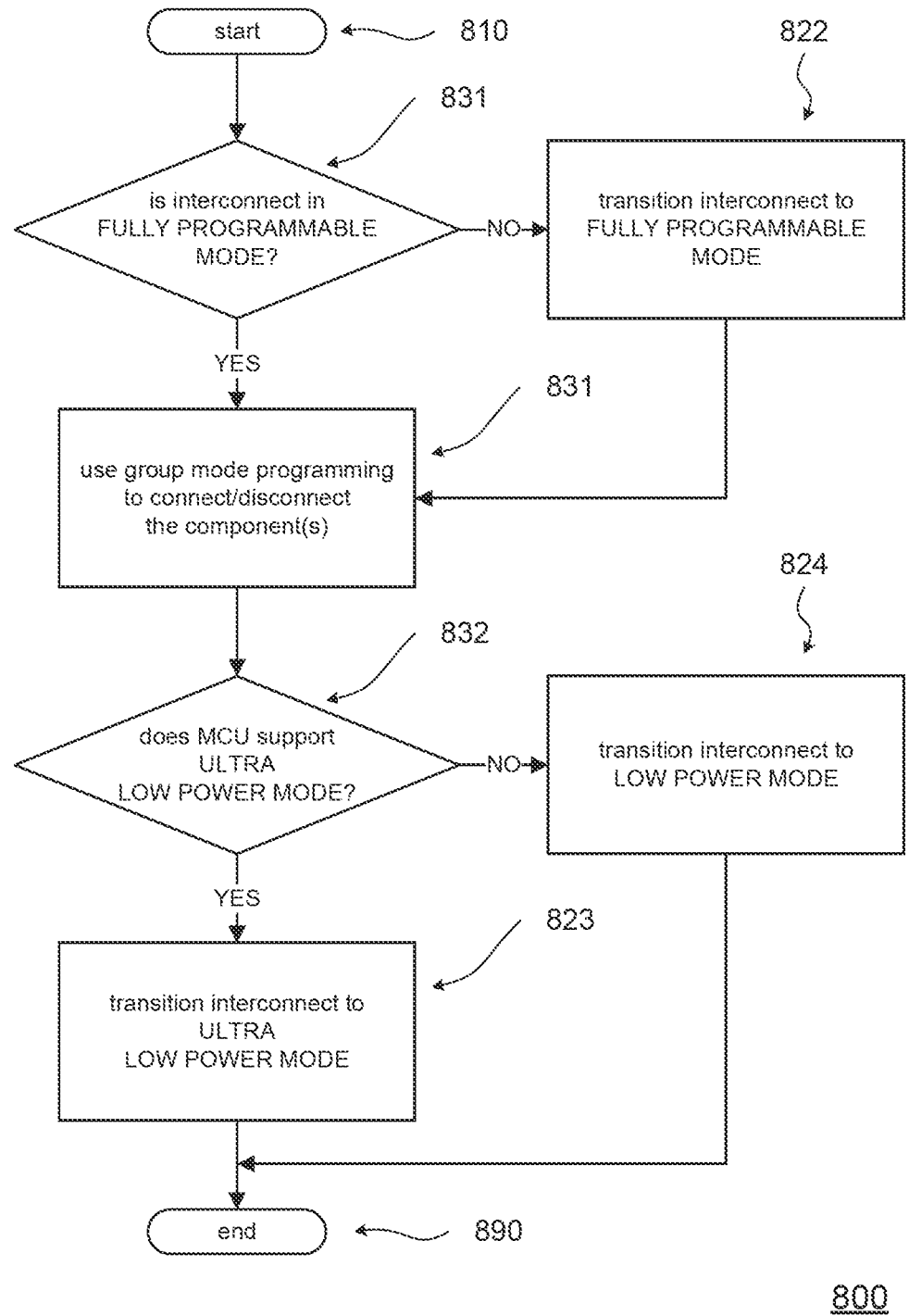
FIG. 8 illustrates a dynamic hardware programming (DHP) decision flow diagram, in accordance with some embodiments of the disclosure.

FIG. 8 illustrates a dynamic hardware programming decision flow diagram, in accordance with some embodiments of the disclosure. A flow 800 may comprise a start 810, a first portion 821, a second portion 822, a third portion 823, a fourth portion 824, a first condition 831, a second condition 832, and an end 890.

Following start 810, in first condition 831, flow 800 may determine whether an interconnect (e.g., system 200 and/or active smart interconnect portion 210) is in a fully-programmable mode. If so, flow 800 may proceed to first portion 821; otherwise, flow 800 may proceed to second portion 822.

In first portion 821, flow 800 may use "group mode" programming or "group commands" to connect and/or disconnect one or more chiplets (e.g., components). In a "group command," a configuration for a chiplet may be programmed into a set of one or more of shadow CRs (e.g., via a scan chain through the shadow CRs), and the configuration may then be committed (e.g., written from the set of one or more shadow CRs to a corresponding set of one or more CRs) by a triggering event. Following first portion 821, flow 800 may proceed to second condition 832. In second portion 822, flow 800 may transition the interconnect to a fully-programmable mode, and may proceed with first portion 821.

In second condition 832, flow 800 may determine whether the MCU supports an ultra-low-power mode. If so, flow 800 may proceed to third portion 823; otherwise, flow 800 may proceed to fourth portion 824.

In third portion 823, flow 800 may transition the interconnect to the ultra-low-power mode, and may then proceed to end 890. In fourth portion 824, flow 800 may transition the interconnect to a low-power mode, and may then proceed to end 890.

Accordingly, FIG. 8 may depict a DHP decision flowchart to physically connect or disconnect a component to the interconnect. To use DHP in various embodiments, during initial power-on, a boot configuration agent may store an image of a kernel system. The kernel system may comprise the main MCU and/or nonvolatile memory (e.g., Flash memory), and other components which may not be needed for initial power-on may be physically disconnected, and may thereafter contribute zero leakage current to the system.

After power-on, the kernel system may then selectively connect and power-on components as necessary. To do this, the kernel system may enable an interconnect programmability mode, may route sub-components to the MCU's appropriate GPIOs, and may power the sub-components. If the kernel system decides a component is no longer needed, it may go through a similar mechanism or the same mechanism to disconnect the sub-component.

As discussed herein, DHP may advantageously provide the ability to enable and disable sensors at will, which may reduce steady state power consumption and enable features (e.g., OTAHU). Furthermore, this may allow for time multiplexing GPIOs for an MCU in situations in which the MCU is GPIO limited, which may enable more features on a MCU than a PCB can normally support.

Accordingly, with respect to various embodiments, an apparatus (e.g., in accordance with system 200 and/or state machine 500) may comprise a semiconductor interconnect substrate (e.g., comprising active smart interconnect portion 210) and an interface (e.g., interface 290). The semiconductor interconnect substrate may be electrically coupled to one or more components (or chiplets) mounted thereon. The interface may be operable to carry a configuration command set (which may be, e.g., a "group command" as described herein) to the one or more components in a normal operation mode subsequent to a power-up mode.

In some embodiments, the apparatus may comprise a controller (e.g., power kernel and controller 270). The controller may be coupled to the interface and/or may be operable to transmit the configuration command set to the interface.

For some embodiments, the configuration command set may be a second configuration command set, and the interface may also be operable to carry a first configuration command set to the one or more components in the power-up mode.

In some embodiments, the configuration command set may encompass one or more commands to establish a plurality of interface states for the one or more components. For some embodiments, the configuration command set may encompass a triggering event to apply the plurality of interface states substantially simultaneously.

In some embodiments, the configuration command set may encompass one or more resistor disconnection commands (e.g., commands to establish a strapping value on the interface of a chiplet or component). For some embodiments, the apparatus may comprise a strapping pin coupled to the controller (e.g., a strapping pin 255), and the configuration command set may be based upon a logical value of the strapping pin.

In some embodiments, the configuration command set may comprise a Serial Peripheral Interface (SPI) command, or an Inter-Integrated Circuit (I2C) command, or another command.

For some embodiments, the one or more components may comprise a processor circuitry, a memory circuitry, a non-volatile reprogrammable memory, an antenna, and/or a radio circuitry.

Various embodiments may also include a system comprising a power source and component coupled to the power source, the component including an apparatus having one or more features substantially similar to the various types of apparatus discussed herein.

Moreover, with respect to various embodiments, a method (e.g., in accordance with sequence 300, flow 400, flow 500, state machine 600, sequence 700, and/or flow 800) may comprise a placement and an application part. In the placement part, a semiconductor interconnect substrate may be placed into a power-up mode, the semiconductor interconnect substrate being electrically coupled to one or more components mounted thereon. In the application part, a configuration command set may be applied to the one or more components in a normal operation mode subsequent to the power-up mode.

In some embodiments, a controller circuitry coupled to the one or more components may apply the configuration command set to the one or more components. For some embodiments, a component mounted on the semiconductor interconnect substrate applies the configuration command set to the one or more components.

In some embodiments, the configuration command set may encompass one or more commands to establish a plurality of interface states for the one or more components. For some embodiments, the configuration command set may encompass a triggering event to apply the plurality of interface states substantially simultaneously.

In some embodiments, the configuration command set may encompass one or more resistor disconnection commands (e.g., commands to establish a strapping value on the interface of a chiplet or component). For some embodiments, the configuration command set may be a second configuration command set, and the method may comprise another application part, in which a first configuration command set is applied to the one or more components in the power-up mode.

The mechanisms and methods disclose herein may enable new use cases and may minimize churn with regard to system design and legacy support when introducing an active smart interconnect to an existing PCB design. This may advantageously accelerate product design, since a generic interconnect may be utilized with many different systems with a simple boot configuration patch. The design and/or manufacturing time of PCBs may thereby be advantageously reduced or even eliminated in a product design flow, and manufacturing may now simply comprise picking and placing pre-assembled components together. The mechanisms and methods disclosed herein may also advantageously allow for minimal changes to legacy code, and with additional firmware support may advantageously enable new functional that can greatly reduce system power consumption and introduce greater system flexibility compared to a static PCB design.

Although the actions in the flowchart with reference to FIGS. 4-5 and 8 are shown in a particular order, the order of the actions can be modified. Thus, the illustrated embodiments can be performed in a different order, and some actions may be performed in parallel. Some of the actions and/or operations listed in FIGS. 4-5 and 8 are optional in accordance with certain embodiments. The numbering of the actions presented is for the sake of clarity and is not intended to prescribe an order of operations in which the various actions must occur. Additionally, operations from the various flows may be utilized in a variety of combinations.

In some embodiments, an apparatus may comprise means for performing various actions and/or operations of the methods of FIGS. 4-5 and 8.

Moreover, in some embodiments, machine readable storage media may have executable instructions that, when executed, cause one or more processors to perform an operation comprising the methods of FIGS. 4-5 and 8. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

Moreover, in some embodiments, machine readable storage media may have executable instructions that, when executed, cause one or more processors to perform an operation comprising the methods of FIGS. 4-5 and 8. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

Figure 9:
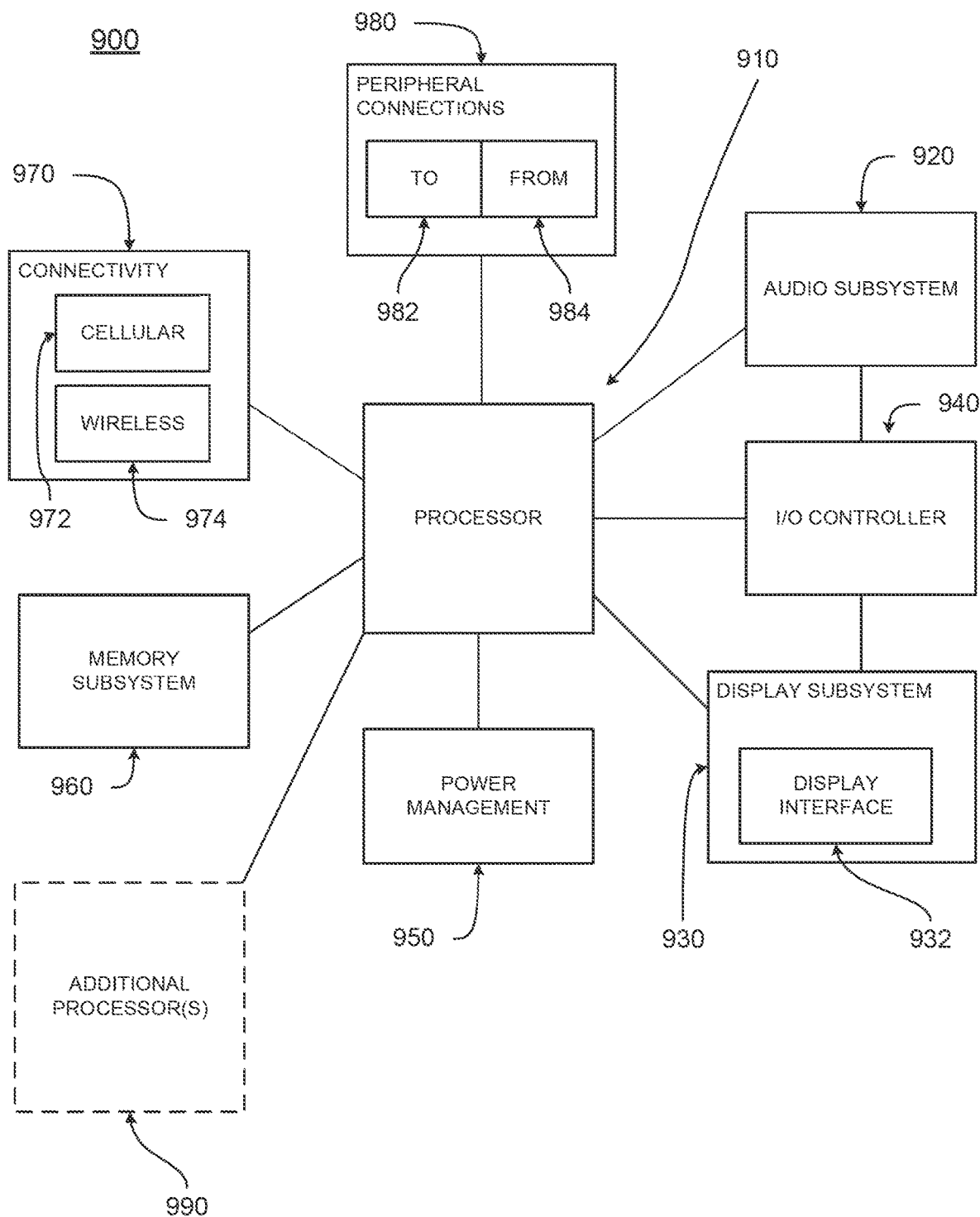
FIG. 9 illustrates a computing device with mechanisms to support DHP, in accordance with some embodiments of the disclosure.

FIG. 9 illustrates a computing device with mechanisms to support dynamic hardware programmability, in accordance with some embodiments of the disclosure. Computing device 900 may be a computer system, a System-on-a-Chip (SoC), a tablet, a mobile device, an Internet-of-Things device, a wearable device, a smart device, or a smart phone with mechanisms to support dynamic hardware programmability, in accordance with some embodiments of the disclosure. It will be understood that certain components of computing device 900 are shown generally, and not all components of such a device are shown FIG. 9. Moreover, while some of the components may be physically separate, others may be integrated within the same physical package, or even on the same physical silicon die. Accordingly, the separation between the various components as depicted in FIG. 9 may not be physical in some cases, but may instead be a functional separation. It is also pointed out that those elements of FIG. 9 having the same names or reference numbers as the elements of any other figure can operate or function in any manner similar to that described, but are not limited to such.

In various embodiments, the components of computing device 900 may include any of a processor 910, an audio subsystem 920, a display subsystem 930, an I/O controller 940, a power management component 950, a memory subsystem 960, a connectivity component 970, one or more peripheral connections 980, and one or more additional processors 990. In some embodiments, processor 910 may include mechanisms to support dynamic hardware programmability, in accordance with some embodiments of the disclosure. In various embodiments, however, any of the components of computing device 900 may include mechanisms to support dynamic hardware programmability, in accordance with some embodiments of the disclosure. In addition, one or more components of computing device 900 may include an interconnect fabric having a plurality of ports, such as a router, a network of routers, or a Network-on-a-Chip (NoC).

Processor 910 may be a general-purpose processor or CPU (Central Processing Unit). In some embodiments, processor 910 may include one or more physical devices, such as microprocessors, application processors, microcontrollers, programmable logic devices, or other processing means. The processing operations performed by processor 910 may include the execution of an operating platform or operating system on which applications and/or device functions may then be executed. The processing operations may also include operations related to one or more of the following: audio I/O; display I/O; power management; connecting computing device 900 to another device; and/or I/O (input/output) with a human user or with other devices.

Audio subsystem 920 may include hardware components (e.g., audio hardware and audio circuits) and software components (e.g., drivers and/or codecs) associated with providing audio functions to computing device 900. Audio functions can include speaker and/or headphone output as well as microphone input. Devices for such functions can be integrated into computing device 900, or connected to computing device 900. In one embodiment, a user interacts with computing device 900 by providing audio commands that are received and processed by processor 910.

Display subsystem 930 may include hardware components (e.g., display devices) and software components (e.g., drivers) that provide a visual and/or tactile display for a user to interact with computing device 900. Display subsystem 930 may include a display interface 932, which may be a particular screen or hardware device used to provide a display to a user. In one embodiment, display interface 932 includes logic separate from processor 910 to perform at least some processing related to the display. In some embodiments, display subsystem 930 includes a touch screen (or touch pad) device that provides both output and input to a user.

I/O controller 940 may include hardware devices and software components related to interaction with a user. I/O controller 940 may be operable to manage hardware that is part of audio subsystem 920 and/or display subsystem 930. Additionally, I/O controller 940 may be a connection point for additional devices that connect to computing device 900, through which a user might interact with the system. For example, devices that can be attached to computing device 900 might include microphone devices, speaker or stereo systems, video systems or other display devices, keyboard or keypad devices, or other I/O devices for use with specific applications such as card readers or other devices.

As mentioned above, I/O controller 940 can interact with audio subsystem 920 and/or display subsystem 930. For example, input through a microphone or other audio device can provide input or commands for one or more applications or functions of computing device 900. Additionally, audio output can be provided instead of, or in addition to, display output. In another example, if display subsystem 930 includes a touch screen, the display device may also act as an input device, which can be at least partially managed by I/O controller 940. There can also be additional buttons or switches on computing device 900 to provide I/O functions managed by I/O controller 940.

In some embodiments, I/O controller 940 manages devices such as accelerometers, cameras, light sensors or other environmental sensors, or other hardware that can be included in computing device 900. The input can be part of direct user interaction, and may provide environmental input to the system to influence its operations (such as filtering for noise, adjusting displays for brightness detection, applying a flash for a camera, or other features).

Power management component 950 may include hardware components (e.g., power management devices and/or circuitry) and software components (e.g., drivers and/or firmware) associated with managing battery power usage, battery charging, and features related to power saving operation.

Memory subsystem 960 may include one or more memory devices for storing information in computing device 900. Memory subsystem 960 can include nonvolatile memory devices (whose state does not change if power to the memory device is interrupted) and/or volatile memory devices (whose state is indeterminate if power to the memory device is interrupted). Memory subsystem 960 can store application data, user data, music, photos, documents, or other data, as well as system data (whether long-term or temporary) related to the execution of the applications and functions of computing device 900.

Some portion of memory subsystem 960 may also be provided as a non-transitory machine-readable medium for storing the computer-executable instructions (e.g., instructions to implement any other processes discussed herein). The machine-readable medium may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, some embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity component 970 may include a network interface, such as a cellular interface 972 or a wireless interface 974 (so that an embodiment of computing device 900 may be incorporated into a wireless device such as a cellular phone or a personal digital assistant). In some embodiments, connectivity component 970 includes hardware devices (e.g., wireless and/or wired connectors and communication hardware) and software components (e.g., drivers and/or protocol stacks) to enable computing device 900 to communicate with external devices. Computing device 900 could include separate devices, such as other computing devices, wireless access points or base stations, as well as peripherals such as headsets, printers, or other devices.

In some embodiments, connectivity component 970 can include multiple different types of network interfaces, such as one or more wireless interfaces for allowing processor 910 to communicate with another device. To generalize, computing device 900 is illustrated with cellular interface 972 and wireless interface 974. Cellular interface 972 refers generally to wireless interfaces to cellular networks provided by cellular network carriers, such as provided via GSM or variations or derivatives, CDMA (code division multiple access) or variations or derivatives, TDM (time division multiplexing) or variations or derivatives, or other cellular service standards. Wireless interface 974 refers generally to non-cellular wireless interfaces, and can include personal area networks (such as Bluetooth, Near Field, etc.), local area networks (such as Wi-Fi), and/or wide area networks (such as WiMax), or other wireless communication.

Peripheral connections 980 may include hardware interfaces and connectors, as well as software components (e.g., drivers and/or protocol stacks) to make peripheral connections. It will be understood that computing device 900 could both be a peripheral device to other computing devices (via "to" 982), as well as have peripheral devices connected to it (via "from" 984). The computing device 900 may have a "docking" connector to connect to other computing devices for purposes such as managing content on computing device 900 (e.g., downloading and/or uploading, changing, synchronizing). Additionally, a docking connector can allow computing device 900 to connect to certain peripherals that allow computing device 900 to control content output, for example, to audiovisual or other systems.

In addition to a proprietary docking connector or other proprietary connection hardware, computing device 900 can make peripheral connections 980 via common or standards-based connectors. Common types of connectors can include a Universal Serial Bus (USB) connector (which can include any of a number of different hardware interfaces), a DisplayPort or MiniDisplayPort (MDP) connector, a High Definition Multimedia Interface (HDMI) connector, a Firewire connector, or other types of connectors.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A non-transitory machine-readable storage media having machine-readable instructions stored thereon, that when executed, cause one or more machines, to perform a method comprising:
   placing a semiconductor interconnect substrate into a power-up mode, the semiconductor interconnect substrate being electrically coupled to one or more components mounted thereon; and
   applying a configuration command set to the one or more components in a normal operation mode subsequent to the power-up mode, wherein applying the configuration command set comprises sequencing configuration of the one or more components based on configuration register values associated with a boot configuration, wherein the configuration command set encompasses a resistor disconnection command that establishes a strapping or logical value on an interface of a component, of the one or more components, with a plurality of strapping pins coupled to the component, and wherein the plurality of strapping pins are operable to configure a static behavior of an interconnect of the semiconductor interconnect substrate.

2. The non-transitory machine-readable storage media of claim 1, having machine-readable instructions stored thereon, that when executed, cause the one or more machines, to perform a further method comprising:
   sequencing power of a microcontroller unit in response to sequencing the configuration of the one or more components.

3. The non-transitory machine-readable storage media of claim 1, having machine-readable instructions stored thereon, that when executed, cause the one or more machines, to perform a further method comprising:
   establishing a plurality of interface states for the one or more components.

4. The non-transitory machine-readable storage media of claim 1, wherein the configuration command set encompasses a triggering event to apply a plurality of interface states substantially simultaneously.

5. The non-transitory machine-readable storage media of claim 1, wherein the configuration command set is a second configuration command set, and wherein the machine-readable storage media has machine-readable instructions stored thereon, that when executed, cause the one or more machines, to perform a further method comprising:
   applying a first configuration command set to the one or more components in the power-up mode.

6. The non-transitory machine-readable storage media of claim 1 having machine-readable instructions stored thereon, that when executed, cause the one or more machines, to perform a further method comprising:
   electrically disconnecting a mounted component from the semiconductor interconnect substrate.

7. The non-transitory machine-readable storage media of claim 1, wherein the semiconductor interconnect substrate includes within it a logic to handle sequence and/or control of power functions for the one or more components, wherein the semiconductor interconnect substrate includes within it a microcontroller unit.

8. The non-transitory machine-readable storage media of claim 7, wherein the logic, to handle sequence and/or control of power functions for the one or more components, comprises: a power management unit; a power kernel and controller coupled to the power management unit, and a memory coupled to the power kernel and controller.

9. The non-transitory machine-readable storage media of claim 7 having machine-readable instructions stored thereon, that when executed, cause the one or more machines, to perform a further method comprising:
   sequencing one or more reset signals to reset the microcontroller unit.

10. The non-transitory machine-readable storage media of claim 7, wherein the semiconductor interconnect substrate includes within it a microelectromechanical system-based temperature compensated crystal oscillator coupled to the microcontroller unit.

\* \* \* \* \*